US012578142B2

(12) United States Patent
Iura et al.

(10) Patent No.: US 12,578,142 B2
(45) Date of Patent: Mar. 17, 2026

(54) DRY SPACE CREATION APPARATUS AND DRY SPACE CREATION METHOD

(71) Applicant: HONDA MOTOR CO., LTD., Tokyo (JP)

(72) Inventors: Satonori Iura, Saitama (JP); Masaki Kunigami, Saitama (JP); Shuga Ikeda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 733 days.

(21) Appl. No.: 18/048,447

(22) Filed: Oct. 21, 2022

(65) Prior Publication Data

US 2023/0129343 A1 Apr. 27, 2023

(30) Foreign Application Priority Data

Oct. 25, 2021 (JP) ................................. 2021-173903

(51) Int. Cl.

*F24F 3/00* (2006.01)
*F16K 7/10* (2006.01)
*F24F 3/08* (2006.01)
*F24F 3/14* (2006.01)
*F26B 21/00* (2006.01)
*F26B 25/06* (2006.01)

(52) U.S. Cl.

CPC .......... *F26B 21/004* (2013.01); *F26B 25/066* (2013.01)

(58) Field of Classification Search

CPC ....... F24F 3/00; F24F 3/14; F24F 3/08; F26B 21/004; F26B 25/066; F16K 7/10
USPC ............................................................ 34/417
See application file for complete search history.

(56) References Cited

U.S. PATENT DOCUMENTS

2010/0275636 A1 11/2010 Yoshimura et al.
2022/0290875 A1* 9/2022 Iura ....................... F24F 13/082

FOREIGN PATENT DOCUMENTS

| | | | |
|---|---|---|---|
| CN | 107101467 | A | 8/2017 |
| CN | 108522678 | A | 9/2018 |
| CN | 108955174 | A | 12/2018 |
| CN | 111829311 | A | 10/2020 |
| CN | 112880107 | A | 6/2021 |
| JP | S60142185 | A | 7/1985 |

(Continued)

OTHER PUBLICATIONS

Office Action issued May 3, 2025 in the CN Patent Application No. 202211287410.X.

(Continued)

*Primary Examiner* — Deming Wan
(74) *Attorney, Agent, or Firm* — CKC & Partners Co., LLC

(57) ABSTRACT

A dry space creation apparatus includes a processing tank, expansion members, an ejection unit, a dry gas supplier, and a controller. The processing tank has an internal space. The expansion members are provided in the processing tank and expand while leaving part of the internal space. The ejection unit ejects gas in the internal space out of the processing tank. The dry gas supplier supplies dry gas to the internal space. The controller performs first control to allow the ejection unit to eject the gas in the internal space out of the processing tank with the expansion members expanding, and then performs second control to allow the dry gas supplier to supply the dry gas to the internal space with the expansion members contracting.

14 Claims, 15 Drawing Sheets

(56) References Cited

FOREIGN PATENT DOCUMENTS

| | | | |
|---|---|---|---|
| JP | H0549294 | U | 6/1993 |
| JP | H05172460 | A | 7/1993 |
| JP | 2005061719 | A | 3/2005 |
| JP | 2009190163 | A | 8/2009 |

OTHER PUBLICATIONS

Notification of Reasons for Refusal issued in the JP Patent Application No. 2021-173903, mailed on May 9, 2023.
Office Action issued Nov. 29, 2024 in the CN Patent Application No. 202211287410.X.

* cited by examiner

DRY SPACE CREATION APPARATUS AND DRY SPACE CREATION METHOD

This application is based on and claims the benefit of priority from Japanese Patent Application 2021-173903, filed on 25 Oct. 2021, the content of which is incorporated herein by reference.

BACKGROUND OF THE INVENTION

Field of the Invention

The present invention relates to a dry space creation apparatus and a dry space creation method.

Related Art

Electric-powered vehicles such as electric vehicles (EV) and hybrid electric vehicles (HEV) are becoming more Widespread for reduced carbon dioxide emission and low adverse environmental impact. Research and development for practical use of batteries having a solid electrolyte (solid-state batteries) is in progress in connection with the electric-powered vehicles.

Some solid electrolytes, such as sulfide-based solid electrolytes, are sensitive to moisture. When such a solid electrolyte is used, a dry space creation apparatus for creating dry space (dry environment) is required in a production line of the solid-state battery.

Patent Document 1: Japanese Unexamined Patent Application, Publication No. 2005-61719

SUMMARY OF THE INVENTION

There are two major methods for creating the dry space, i.e., normal gas replacement and vacuum gas replacement.

The first method (normal gas replacement) includes supplying dry gas constantly in an internal space, which is a target space to be dried, of a processing tank, and ejecting gas that originally exists in the internal space, such as air with normal humidity, out of the processing tank by the amount of the dry gas supplied. In this case, the existing gas and the dry gas are replaced, but are simultaneously mixed. Thus, part of the dry gas may be ejected out of the processing tank together with the existing gas. This requires a large amount of dry gas, and takes a longer time for the gas replacement.

The second method (vacuum gas replacement) includes forcibly ejecting the existing gas in the internal space out of the processing tank with a pump, and then supplying the dry gas to the internal space. This method reduces the mixing of the existing gas and the dry gas compared to the first method (normal gas replacement). Thus, the amount of dry gas supplied and the time required for the gas replacement are reduced. However, the internal space is placed under negative pressure, requiring the processing tank to have higher resistance to pressure.

Under these circumstances, the present invention has been achieved to create the dry space while reducing the amount of dry gas supplied, the time required for the gas replacement, and the resistance to pressure required for the processing tank.

The inventors of the present invention have made the present invention based on the following findings. Specifically, a dry space can be created while reducing the amount of dry gas supplied, time required for gas replacement, and resistance to pressure required for a processing tank can be reduced if gas existing in an internal space of the processing tank is ejected out of the processing tank with an expansion member placed in the processing tank expanding, and then dry gas is supplied to the internal space with the expansion member contracting. The present invention is directed to a dry space creation apparatus of the following aspects (1) to (9), and a dry space creation method of aspect (10).

(1) A dry space creation apparatus, including: a processing tank having an internal space;

an expansion member that expands while leaving part of the internal space, the expansion member being provided in the processing tank;

an ejection unit that ejects gas in the internal space out of the processing tank; and a dry gas supplier that supplies dry gas to the internal space; and a controller that performs first control to allow the ejection unit to eject the gas in the internal space out of the processing tank with the expansion member expanding, and then performs second control to allow the dry gas supplier to supply the dry gas to the internal space with the expansion member contracting.

According to aspect (1), the gas (existing gas) in the internal space is ejected out of the processing tank by the first control, and then the dry gas is supplied to the internal space by the second control. Thus, compared to when the dry gas is supplied to the internal space without ejecting the existing gas (normal gas replacement), the existing gas and the dry gas are less likely to mix together, and the dry gas is kept from being ejected out of the processing tank together with the existing gas. This allows creation of a dry space while reducing the amount of dry gas supplied and the time required for the gas replacement.

The first control allows the expansion member to expand when the gas in the internal space is ejected out of the processing tank. Thus, compared to when the gas is forcibly ejected with the expansion member not expanding (vacuum gas replacement), negative pressure applied to the internal space can be reduced. This reduces the resistance to pressure required for the processing tank.

According to aspect (1), the dry space can be created while reducing the amount of dry gas supplied, the time required for the gas replacement, and the resistance to pressure required for the processing tank. The second control performed after the first control allows the expansion member to contract, providing a sufficiently large working space in the internal space.

(2) The dry space creation apparatus of aspect (1), wherein the controller performs, after the first control and before the second control, replacement control to allow the ejection unit to eject the gas in the internal space out of the processing tank with the expansion member kept expanded and the dry gas supplier kept supplying the dry gas to the internal space.

According to aspect (2), a larger amount of existing gas can be ejected out of the processing tank compared to when the second control follows immediately after the first control without performing the replacement control. The replacement control causes the expansion member to expand, shrinking the internal space. This allows efficient gas replacement.

(3) The dry space creation apparatus of aspect (1) or (2), further including: a detector that detects a dew-point temperature of the internal space, wherein the controller starts the second control when a parameter that varies depending on the dew-point temperature of the internal space is equal to or less than a threshold value.

According to aspect (3), the second control is started based on the dew-point temperature. Thus, the second control can be started appropriately at the right time.

(4) The dry space creation apparatus of any one of aspects (1) to (3), further including: a working instrument fixed to an inner bottom surface of the processing tank; and a glove attached to a working surface that is one of inner wall surfaces of the processing tank and allows an operator to handle the working instrument from outside of the processing tank, wherein the expansion member is provided for at least one of the inner wall surfaces other than the working surface.

According to aspect (4), interference between the glove and the expansion member can be avoided.

(5) The dry space creation apparatus of aspect (4), wherein the expansion member is provided for each of the inner wall surfaces other than the working surface and for a ceiling surface of the processing tank.

According to aspect (5), the expansion members can efficiently compress (reduce) the internal space when the first control is performed.

(6) The dry gas creation apparatus of any one of aspects (1) to (5), further including: an air intake device that forcibly sucks gas outside the processing tank into an expansion space, the expansion space being configured to allow the expansion member to expand and contract, wherein when the first control is performed, the air intake device forcibly sucks the gas into the expansion space so that the expansion member expands.

According to aspect (6), the air intake device allows the expansion member to expand.

(7) The dry space creation apparatus of any one of aspects (1) to (6), wherein the ejection unit includes an ejector that forcibly ejects the gas in the internal space out of the processing tank, wherein when the first control is performed, the ejector forcibly ejects the gas in the internal space out of the processing tank while gas outside the processing tank is allowed to flow into an expansion space so that the expansion member expands under negative pressure applied to the internal space, the expansion space being configured to allow the expansion member to expand and contract.

According to aspect (7), the ejector allows the expansion member to expand.

(8) The dry gas creation apparatus of any one of aspects (1) to (7), further including: an exhaust device that forcibly ejects gas in an expansion space out of the processing tank, the expansion space being configured to allow the expansion member to expand and contract, wherein when the second control is performed, the exhaust device forcibly ejects the gas in the expansion space out of the processing tank so that the expansion member contracts.

According to aspect (8), the exhaust device allows the expansion member to contract.

(9) The dry space creation apparatus of any one of aspects (1) to (8), wherein when the second control is performed, the dry gas supplier supplies dry gas to the internal space while gas in an expansion space is allowed to flow out of the processing tank and the gas in the internal space is disallowed to flow out of the processing tank from the ejection unit so that the expansion member contracts under positive pressure applied to the internal space, the expansion space being configured to allow the expansion member to expand and contract.

According to aspect (9), the dry gas supplier allows the expansion member to contract.

(10) A dry space creation method using a dry space creation apparatus including a processing tank having an internal space;

- an expansion member that expands while leaving part of the internal space, the expansion member being provided in the processing tank;
- an ejection unit that ejects gas in the internal space out of the processing tank; and
- a dry gas supplier that supplies dry gas to the internal space, the dry space creation method including:
- a first process of allowing the ejection unit to eject the gas in the internal space out of the processing tank with the expansion member expanding; and
- a second process of allowing the dry gas supplier to supply the dry gas to the internal space with the expansion member contracting.

The method of aspect (10) can provide the advantages similar to those of the apparatus of aspect (1).

According to the present invention, the first control or the first process is performed, and then the second control or the second process is performed. This can create the dry space while reducing the amount of dry gas supplied, the time required for the gas replacement, and the resistance to pressure required for the processing tank.

Figure 12:
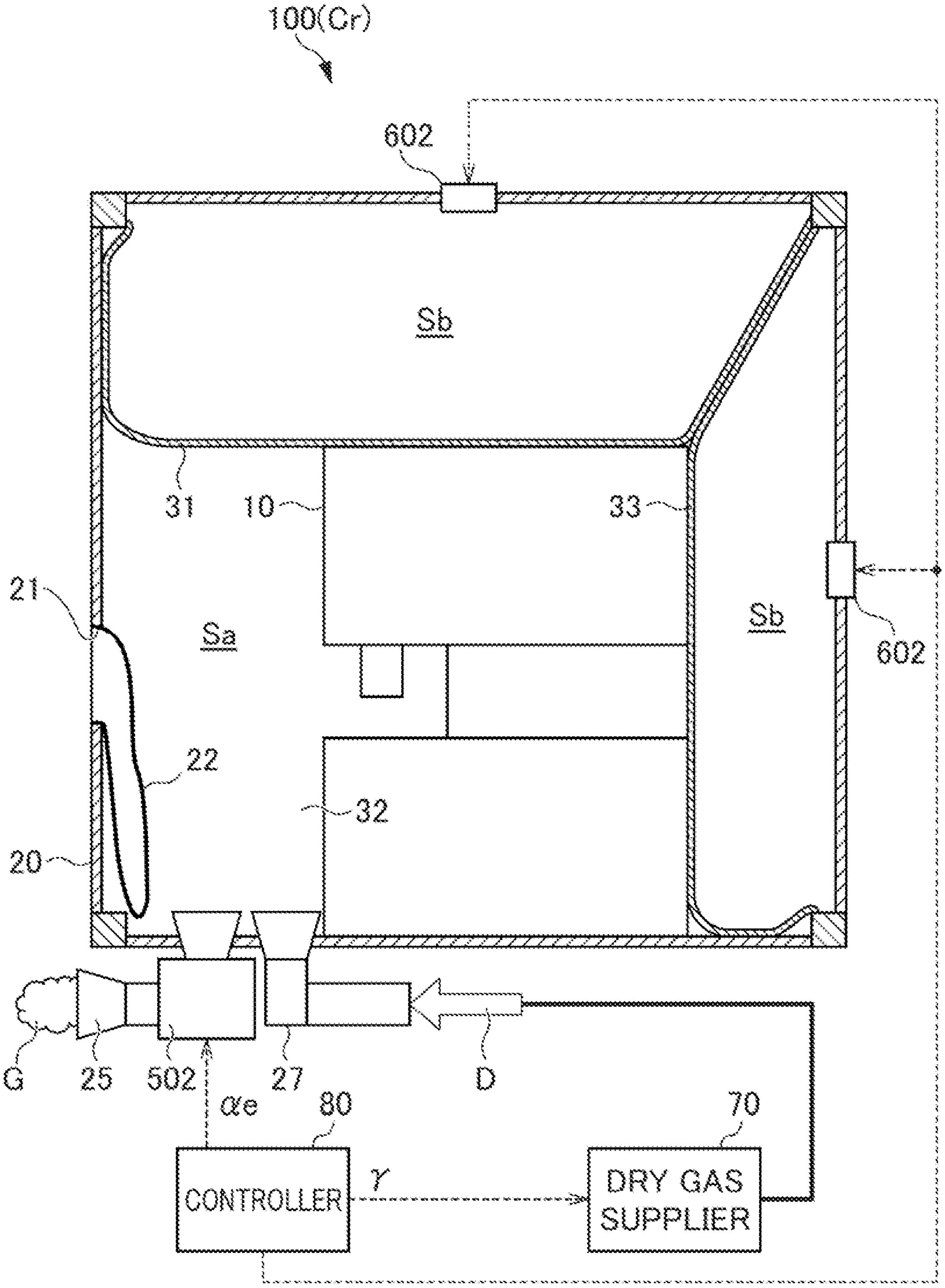
Figure 13:
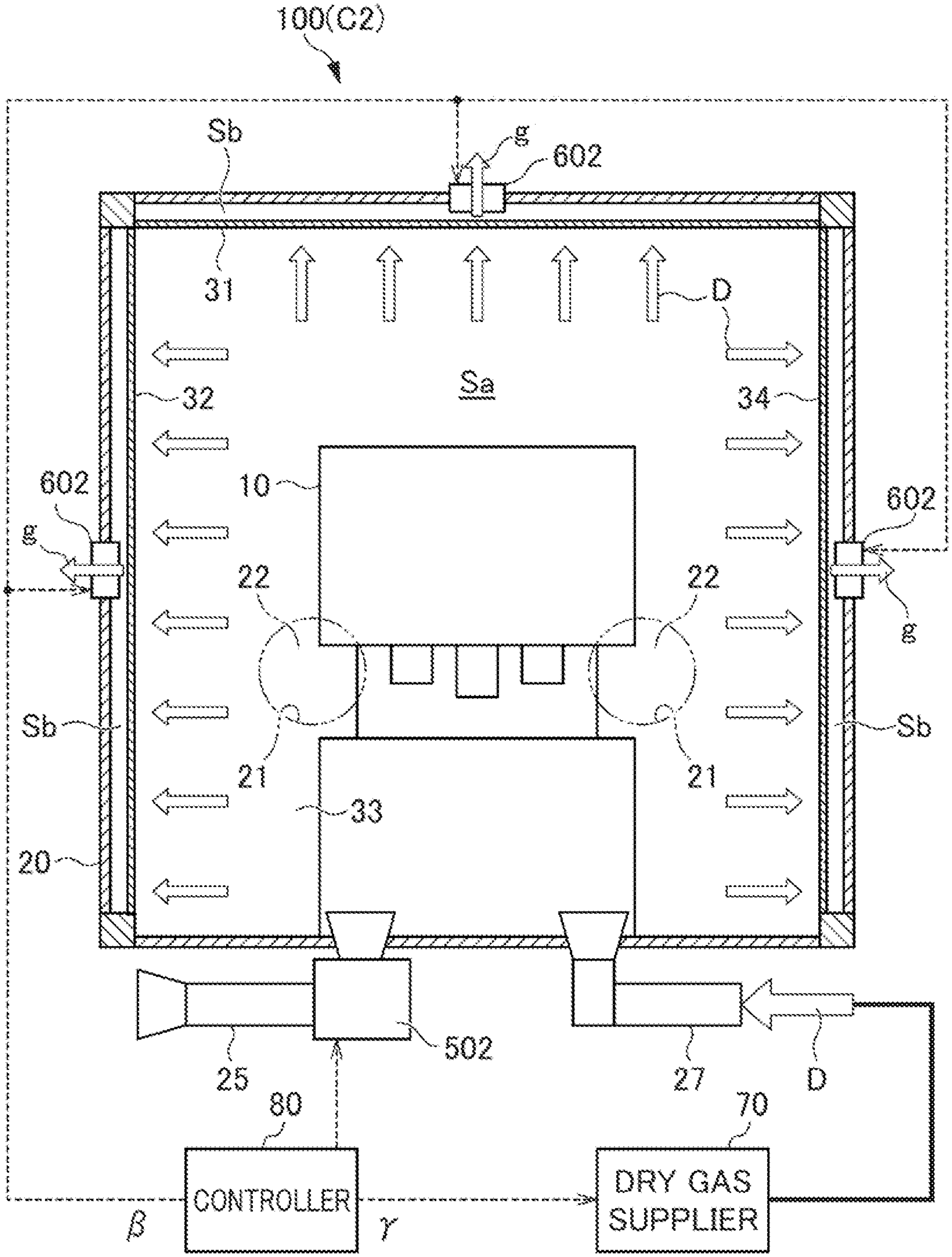
Figure 14:
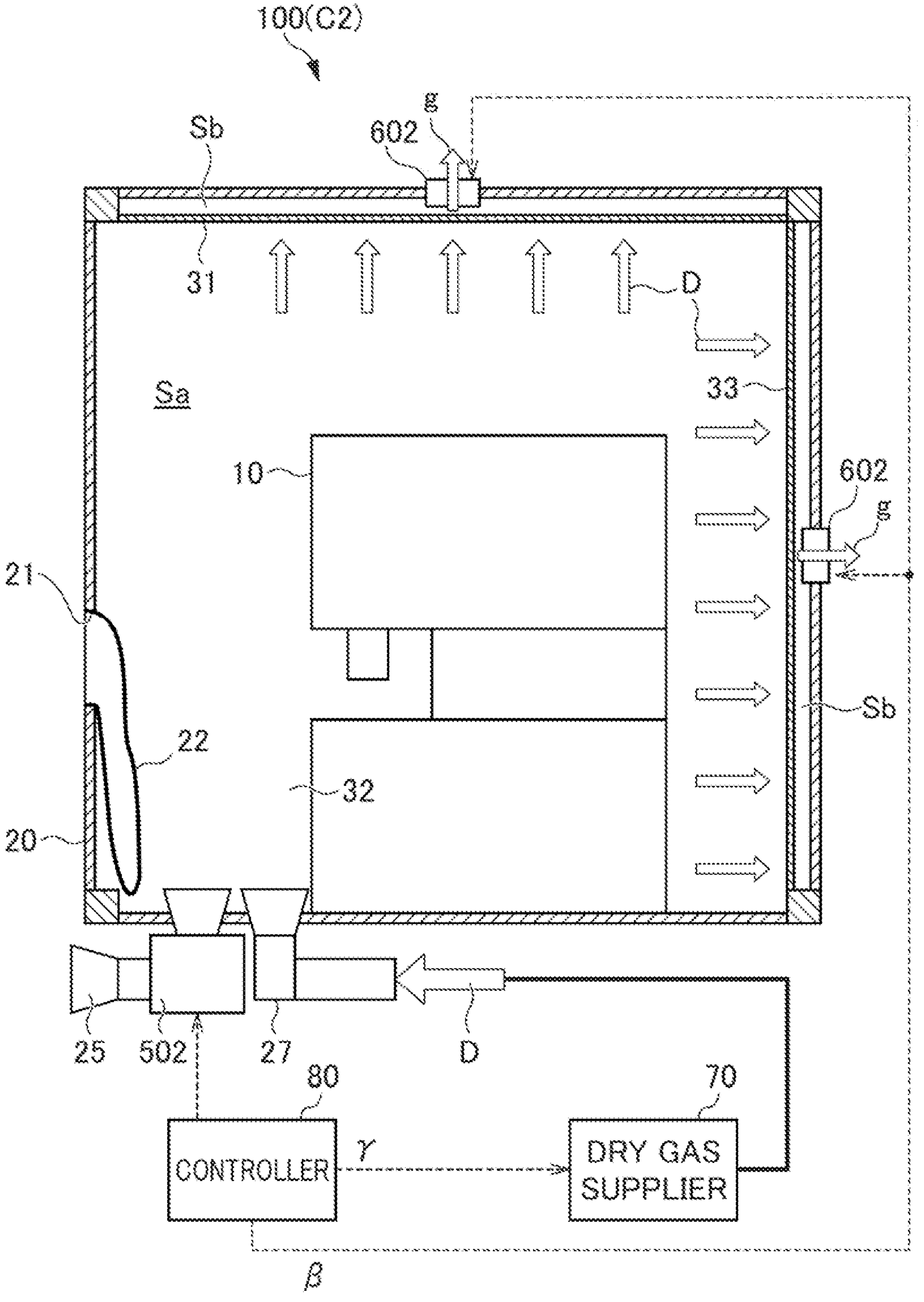
Figure 15:
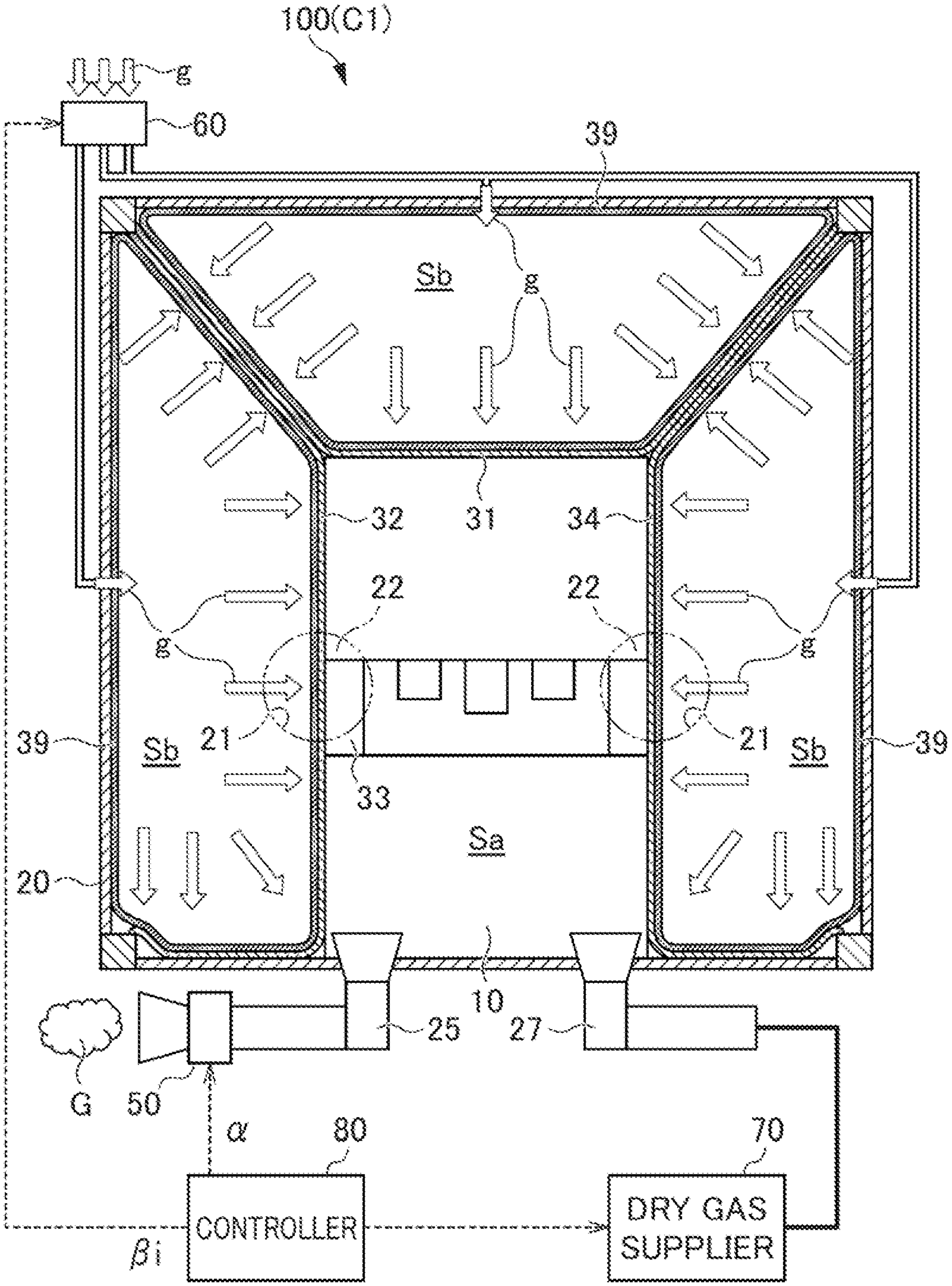

FIG. **1*l*** is a front view illustrating the dry space creation apparatus in replacement control;

FIG. 12 is a side view illustrating the dry space creation apparatus in the replacement control;

FIG. 13 is a front view illustrating the dry space creation apparatus in second control;

FIG. 14 is a side view illustrating the dry space creation apparatus in the second control; and FIG. 15 is a front view illustrating a dry space creation apparatus of a variation.

DETAILED DESCRIPTION OF THE INVENTION

Embodiments of the present invention will be described below with reference to the drawings. Note that the present invention is not limited to the following embodiments, and modifications can be made as appropriate without departing from the scope of the invention.

First Embodiment

Figure 1:
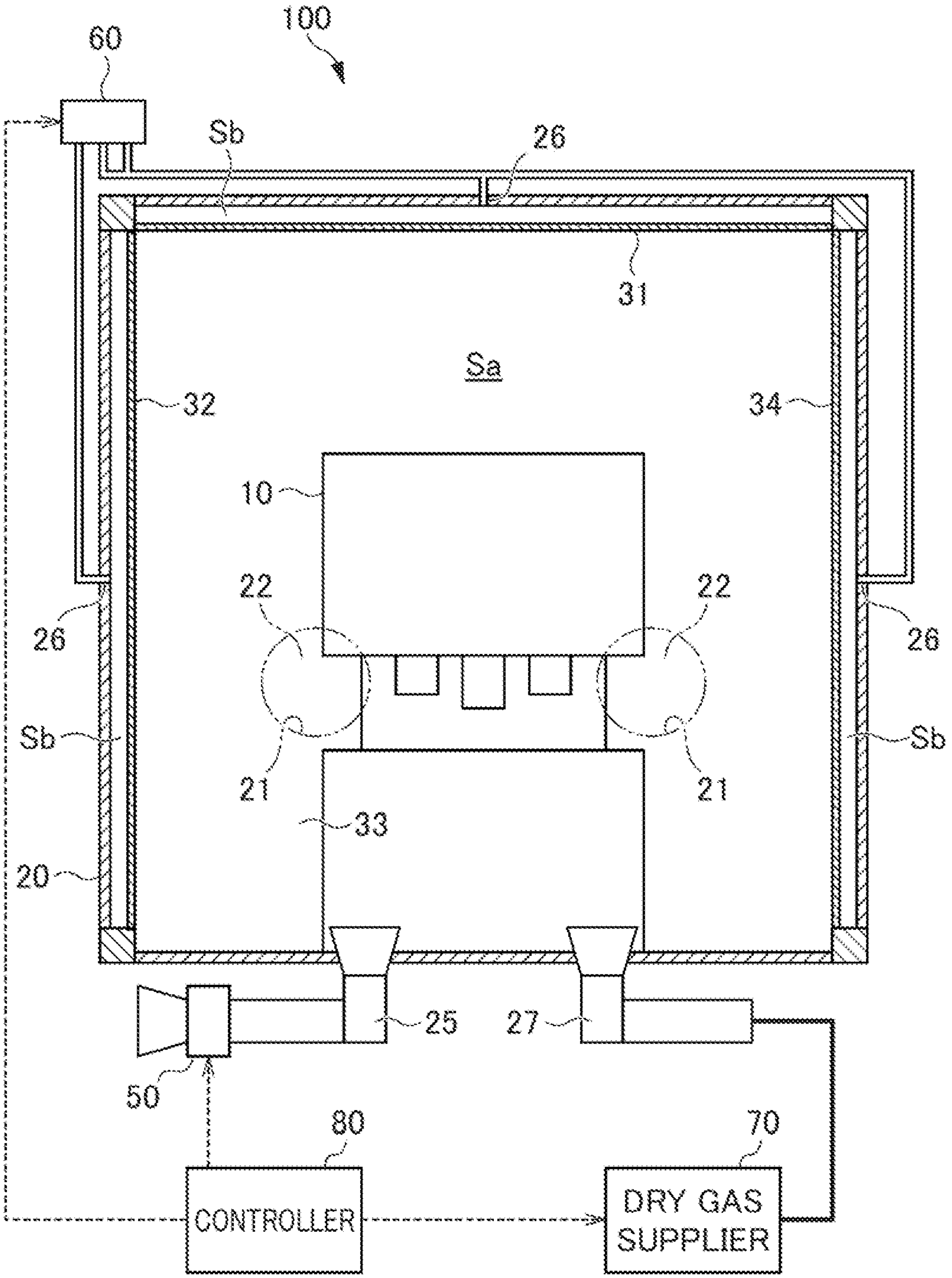
FIG. 1 is a front view (front sectional view) illustrating a dry space creation apparatus of a first embodiment.
Figure 2:
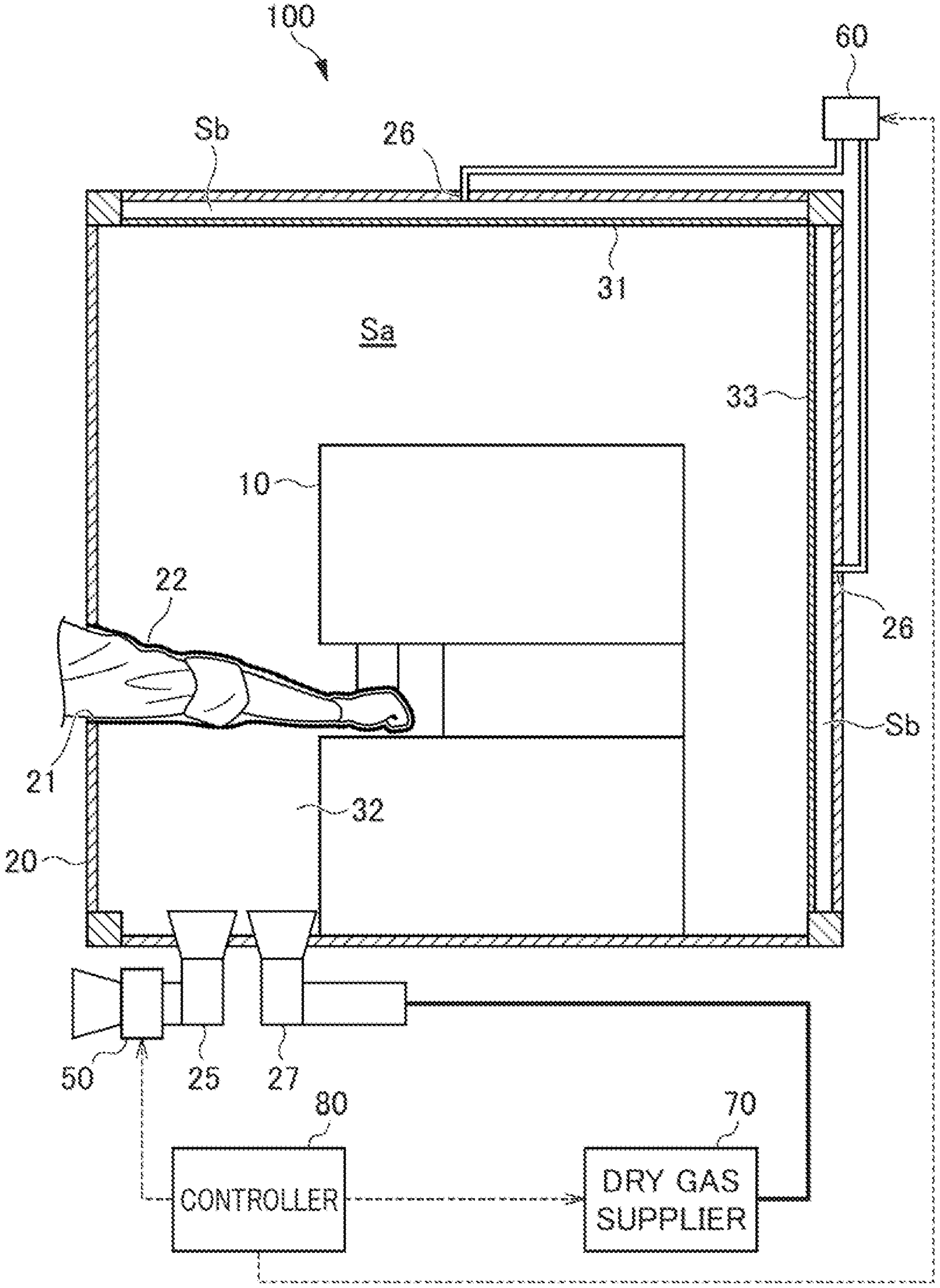
FIG. 2 is a side view (side sectional view) illustrating the dry space creation apparatus.

FIGS. 1 and 2 are a front view (front sectional view) and a side view (side sectional view) illustrating a dry space creation apparatus 100 of the present embodiment. The dry space creation apparatus 100 includes a working instrument 10 and a processing tank 20 that stores the working instrument 10.

The working instrument 10 is used to handle substances that should be kept away from humidity, such as sulfide-based solid electrolytes. Specifically, the working instrument 10 is required to be handled in a dry space (dry environment).

The processing tank 20 includes an internal space Sa, an outlet 25, a supply port 27, and gloves 22. The internal space Sa is a space to be dried. Each of the outlet 25 and the supply port 27 allows the outside of the processing tank 20 to communicate with the internal space Sa.

The working instrument 10 is fixed to an inner bottom surface of the processing tank 20 in the internal space Sa. The gloves 22 are attached to a working surface that is one of inner wall surfaces of the processing tank 20, i.e., a front surface in the drawings. Specifically, the working surface has two through-holes 21 opened from an outer wall surface to the inner wall surface of the processing tank 20, i.e., from the outside of the processing tank 20 to the internal space Sa. The gloves 22 are attached to the through-holes 21. The gloves 22 allow an operator to handle the working instrument 10 from outside of the processing tank 20.

The dry space creation apparatus 100 further includes a discharge valve 50, a dry gas supplier 70, expansion members 31 to 34, an air intake and exhaust device 60, and a controller 80.

The discharge valve 50 is provided for the outlet 25. The discharge valve 50 of the present embodiment is an electronic valve that is opened or closed by the controller 80. The discharge valve 50 opens the outlet 25 when opened, and closes the outlet 25 when closed. The electronic valve may be replaced with a check valve that allows gas to move (flow) from the internal space Sa to the outside of the processing tank 20 and disallows the gas to move (flow) from the outside of the processing tank 20 to the internal space Sa. The outlet 25 and the discharge valve 50 constitute an ejection unit that ejects gas existing in the internal space Sa out of the processing tank 20.

The dry gas supplier 70 produces dry gas by dehumidifying gas, such as air with normal humidity, and is connected to the supply port 27.

The expansion members 31 to 34 are attached to the ceiling surface and all the inner wall surfaces of the processing tank 20 other than the working surface. Specifically, the expansion members 31 to 34 include a ceiling expansion member 31 attached to the ceiling surface, a left expansion member 32 attached to a left inner wall surface, a rear expansion member 33 attached to a rear inner wall surface, and a right expansion member 34 attached to a right inner wall surface.

Each of the expansion members 31 to 34 is a sheet member having an edge seamlessly connected (sealed) to the inner surfaces of the processing tank 20. Thus, each of the expansion members 31 to 34 and the corresponding inner surface of the processing tank 20 form an expansion space Sb therebetween. Each expansion space Sb allows an associated one of the expansion members 31 to 34 to expand and contract. A connecting hole 26 that connects the outside of the processing tank 20 and the expansion space Sb is formed in the ceiling surface and each of the inner wall surfaces of the processing tank 20 other than the working surface.

The air intake and exhaust device 60 is a discharge device such as a blower or a pump, and is connected to each connecting hole 26. The air intake and exhaust device 60 discharges (forcibly sucks) gas outside the processing tank 20 into the expansion spaces Sb to cause the expansion members 31 to 34 to expand, and discharges (forcibly ejects) the gas in the expansion spaces Sb out of the processing tank 20 to cause the expansion members 31 to 34 to contract. Specifically, the air intake and exhaust device 60 serves as an intake device that takes the air into the expansion spaces Sb and an exhaust device that emits the air from the expansion spaces Sb.

The controller 80 controls the discharge valve 50, the air intake and exhaust device 60, and the dry gas supplier 70. When instructed to create a dry space by an operator who handles the dry space creation apparatus 100, the controller 80 performs first control C1 (first process), replacement control Cr (replacement process), and second control C2 (second process) in this order.

Figure 3:
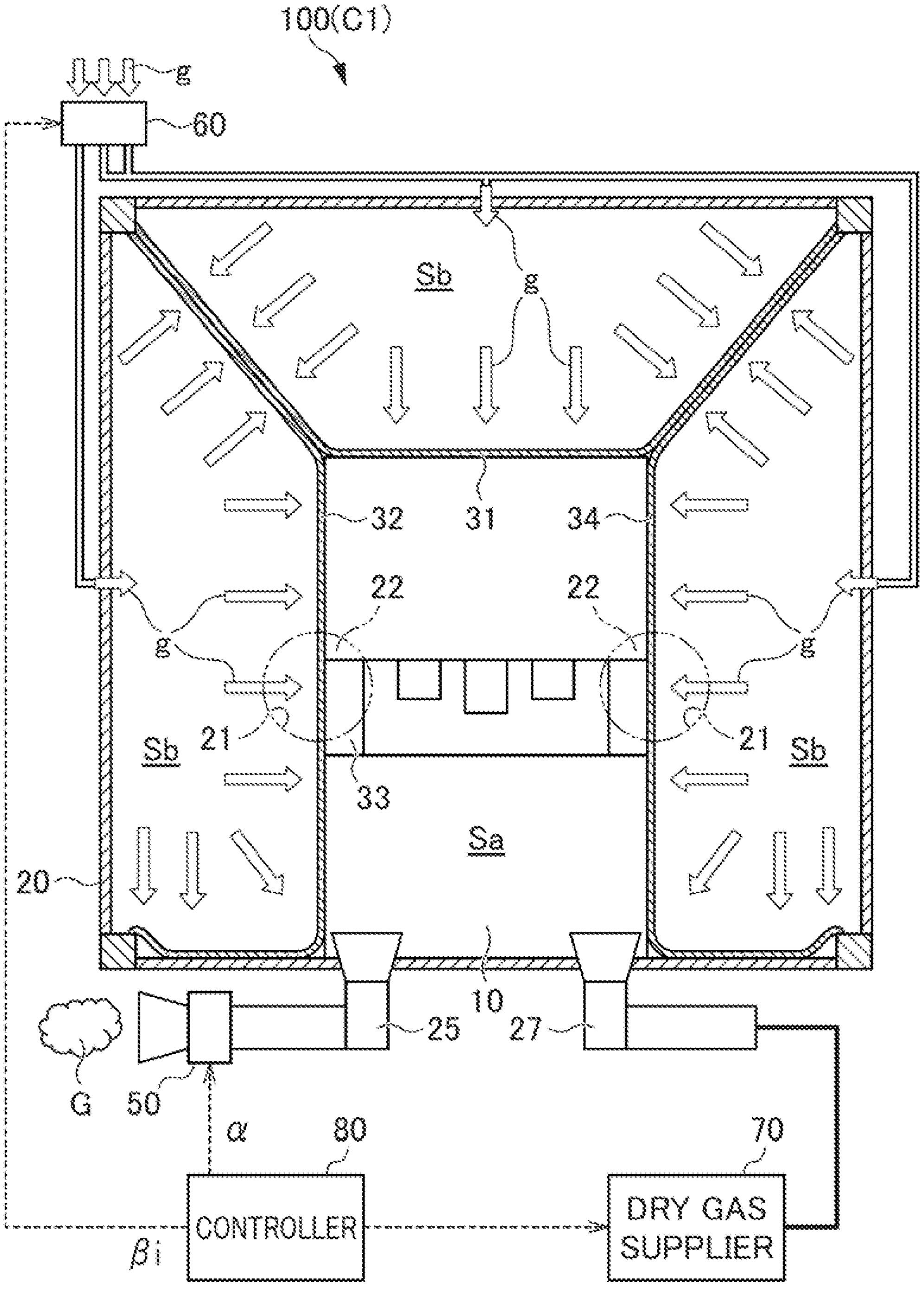
FIG. 3 is a front view illustrating the dry space creation apparatus in first control.
Figure 4:
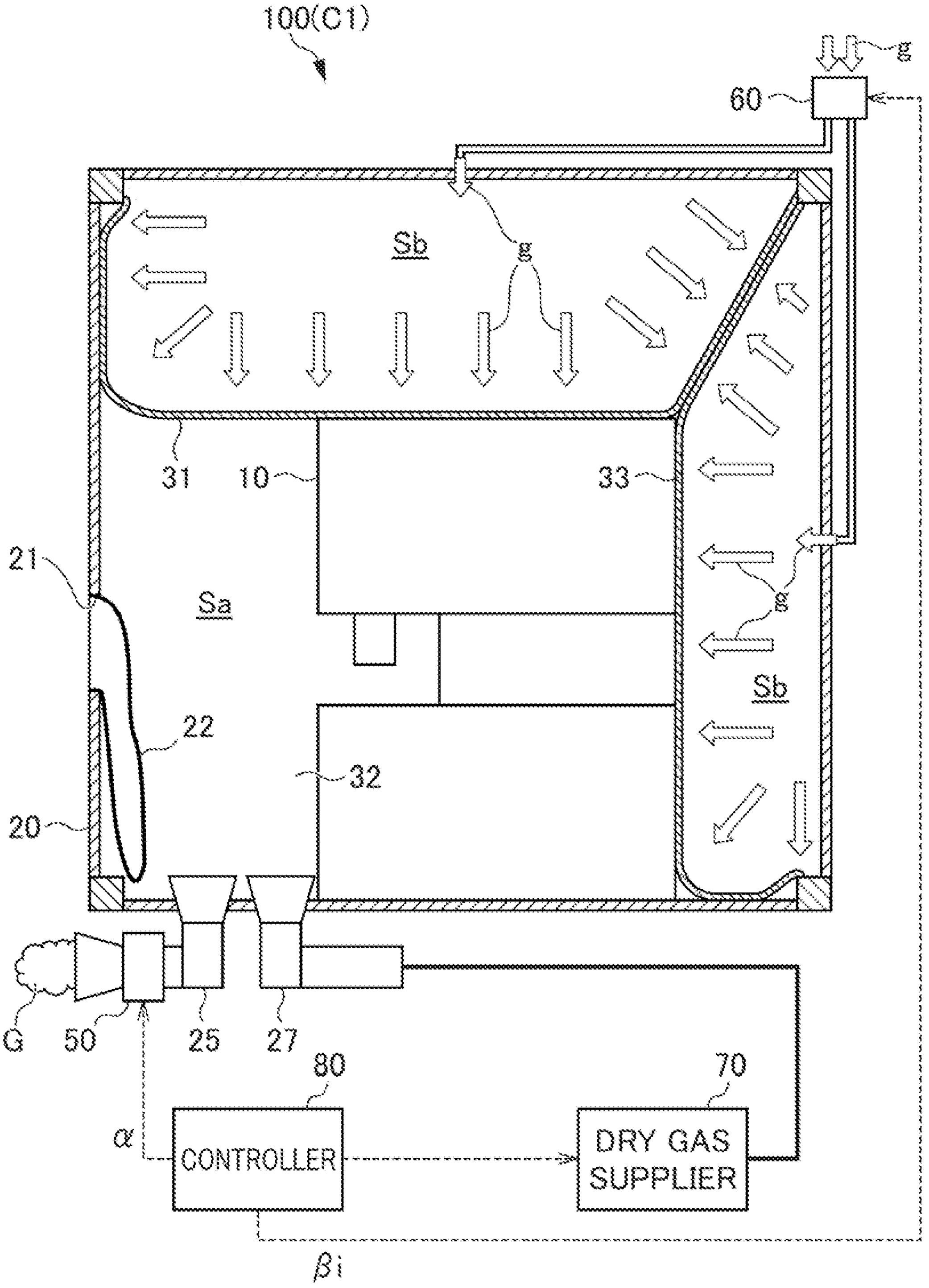
FIG. 4 is a side view illustrating the dry space creation apparatus in the first control.

FIGS. 3 and 4 are a front view and a side view illustrating the dry space creation apparatus 100 in the first control C1. When performing the first control C1, the controller 80 transmits a valve open command & to the discharge valve 50 and transmits an air intake command Bi to the air intake and exhaust device 60. Receiving the valve open command α, the discharge valve 50 opens to open the outlet 25. That is, the discharge valve 50 allows gas G existing in the internal space Sa to flow out of the processing tank 20. Receiving the air intake command Bi, the air intake and exhaust device 60 forcibly sucks gas g outside the processing tank 20 into the expansion spaces Sb. As a result, the expansion members 31 to 34 expand toward the internal space Sa, while leaving part of the internal space Sa, and the existing gas G in the internal space Sa is ejected out of the processing tank 20 from the outlet 25 by the amount of expansion of the expansion members. When a predetermined amount of gas g is sucked into the expansion spaces Sb, the controller 80 ends the first control C1 and starts the replacement control Cr.

Figure 5:
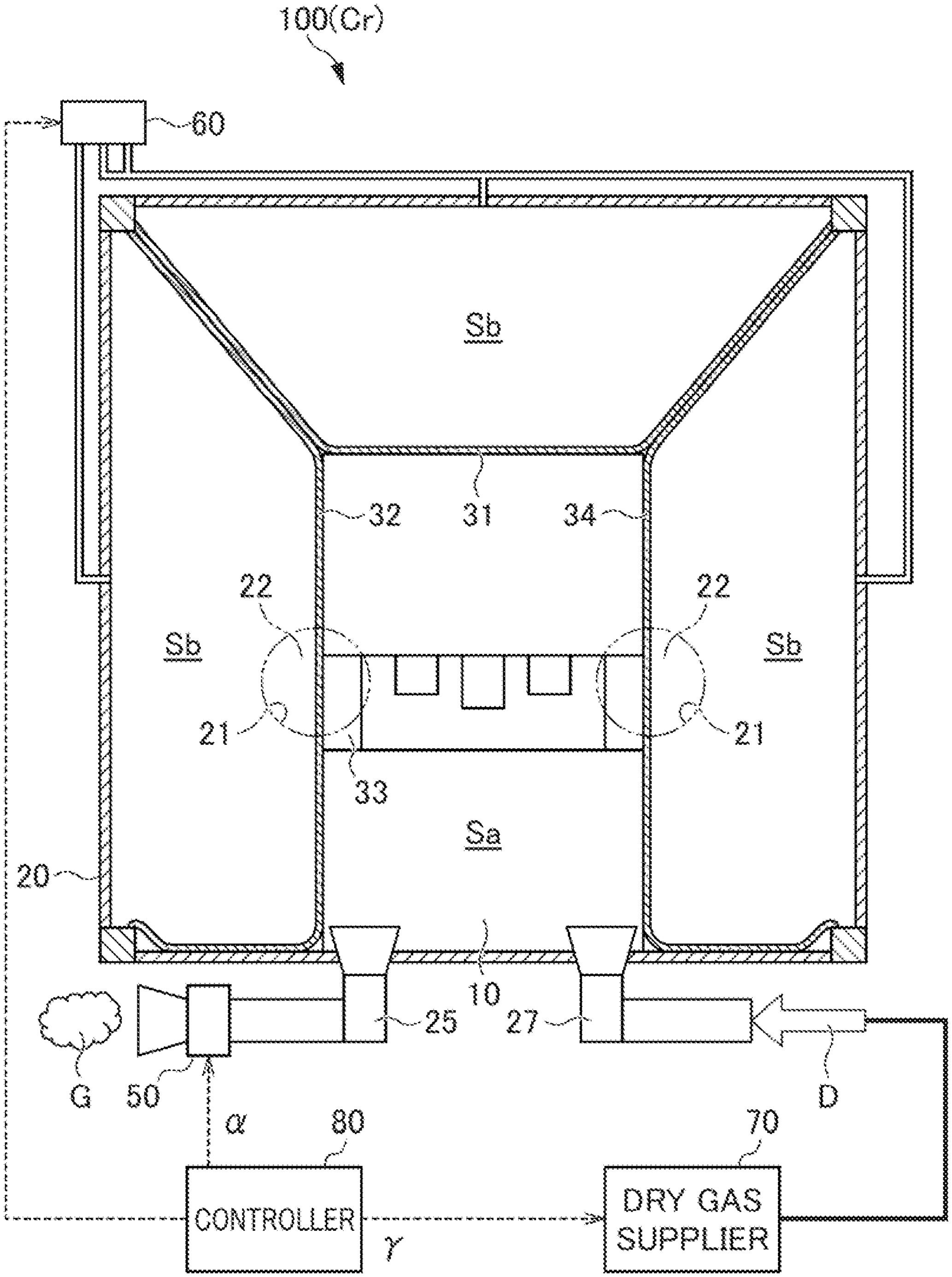
FIG. 5 is a front view illustrating the dry space creation apparatus in replacement control.
Figure 6:
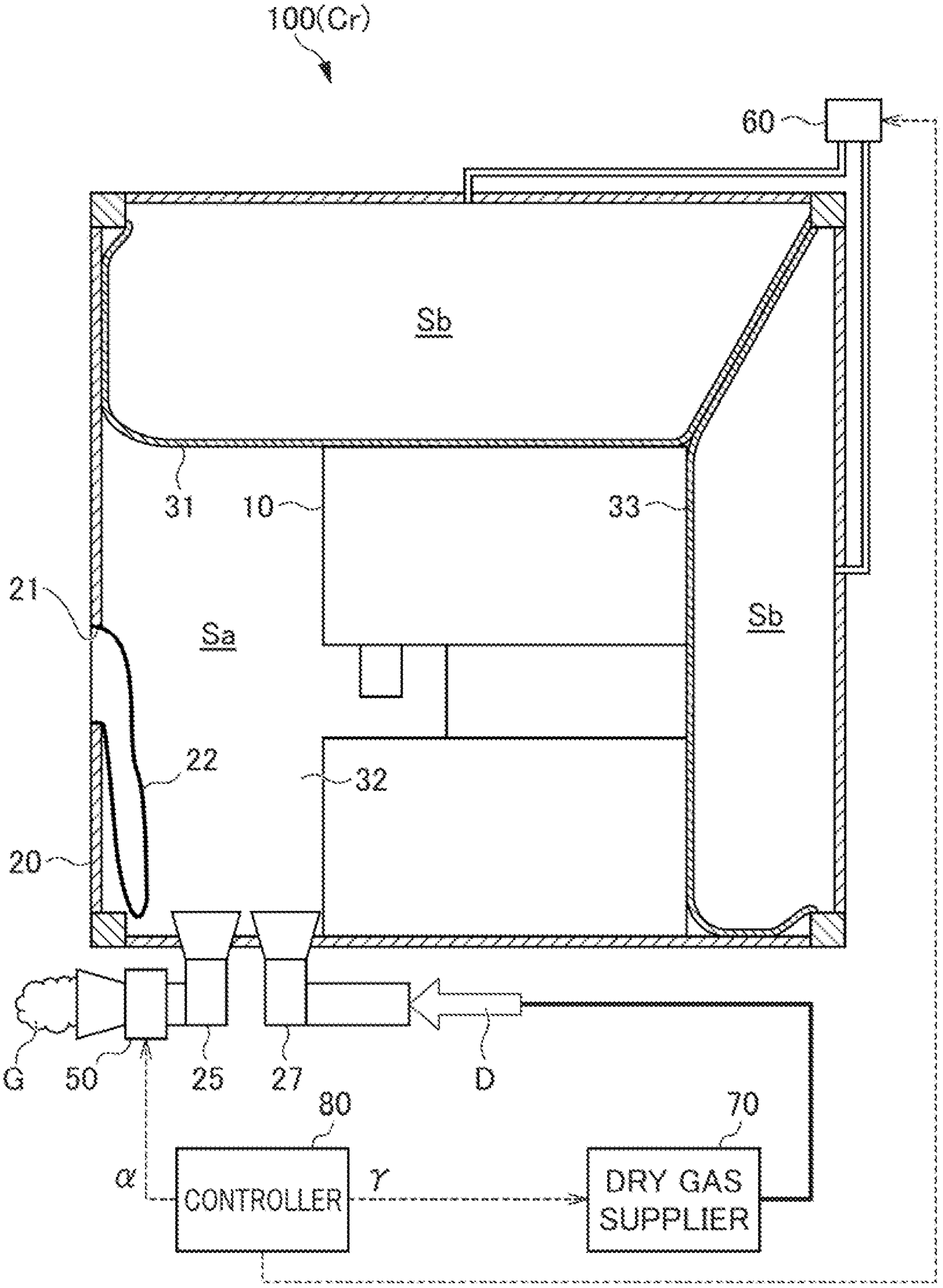
FIG. 6 is a side view illustrating the dry space creation apparatus in the replacement control.

FIGS. 5 and 6 are a front view and a side view illustrating the dry space creation apparatus 100 in the replacement control Cr. When performing the replacement control Cr, the controller 80 keeps giving the valve open command & to the discharge valve 50, stops the air intake command Bi to the air intake and exhaust device 60, and transmits a supply command γ to the dry gas supplier 70. When the air intake command Bi is stopped, the air intake and exhaust device 60 stops sucking the gas g into the expansion spaces Sb. Receiving the supply command γ, the dry gas supplier 70 supplies dry gas D to the internal space Sa. Thus, with the expansion members 31 to 34 kept expanded, the dry gas supplier 70 supplies the dry gas D to the internal space Sa, and the existing gas G in the internal space Sa is ejected out of the processing tank 20 from the discharge valve 50 by the amount of dry gas supplied. As a result, the existing gas G in the internal space Sa is replaced with the dry gas D.

The dry space creation apparatus 100 further includes a detector (not shown) that detects a dew-point temperature of the internal space Sa. The controller 80 ends the replacement control Cr and starts the second control C2 when a parameter that varies depending on the dew-point temperature detected by the detector is equal to or less than a threshold valve.

Figure 7:
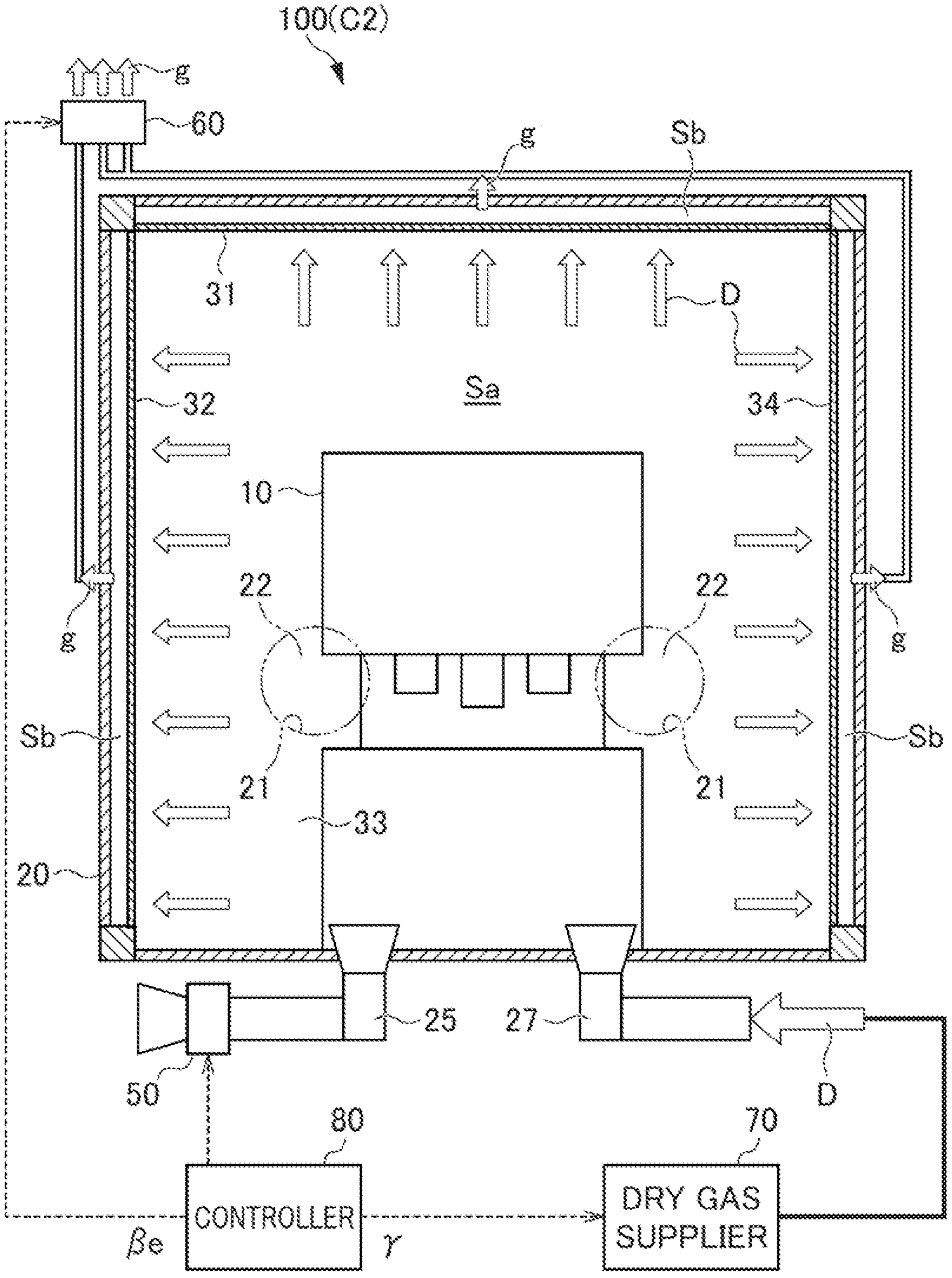
FIG. 7 is a front view illustrating the dry space creation apparatus in second control.
Figure 8:
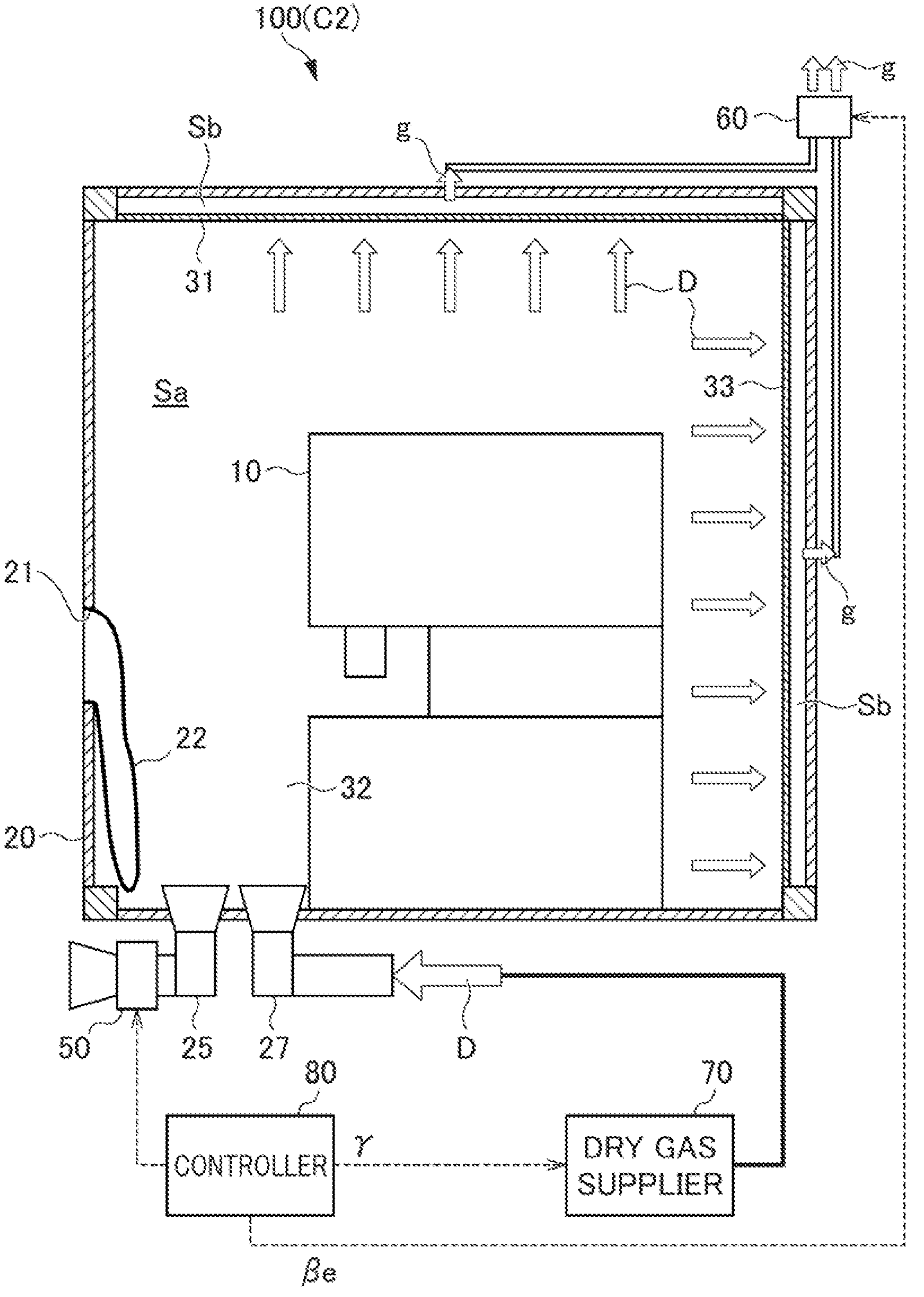
FIG. 8 is a side view illustrating the dry space creation apparatus in the second control.

FIGS. 7 and 8 are a front view and a side view illustrating the dry space creation apparatus 100 in the second control C2. When performing the second control C2, the controller 80 keeps giving the supply command γ to the dry gas supplier 70, stops the valve open command α to the discharge valve 50, and transmits an exhaust command βe to the air intake and exhaust device 60. When the valve open command α is stopped, the discharge valve 50 closes to close the outlet 25. That is, the discharge valve 50 disallows the dry gas D in the internal space Sa to flow out of the processing tank 20. Receiving the exhaust command Be, the air intake and exhaust device 60 forcibly ejects the gas g in the expansion spaces Sb out of the processing tank 20. This allows the expansion members 31 to 34 to contract while keeping the supply of the dry gas D to the internal space Sa. At this time, the dry gas D in the internal space Sa is not ejected out of the processing tank 20, and the pressure in the internal space Sa is kept approximately constant because the increase in pressure caused by the supply of the dry gas D is canceled out by the decrease in pressure caused by the contraction of the expansion members 31 to 34.

The advantages of the present embodiment will be described below. In the present embodiment, the first control C1 is performed to eject the existing gas G in the internal space Sa out of the processing tank 20, and then the replacement control Cr and the second control C2 are performed to supply the dry gas D to the internal space Sa. Thus, compared to when the dry gas D is supplied to the internal space Sa without ejecting the existing gas G (normal gas replacement), the existing gas G and the dry gas D are less likely to mix together, and the dry gas D is kept from being ejected out of the processing tank 20 together with the existing gas G. This can reduce the amount of dry gas D supplied and the time required for the gas replacement.

The first control C1 allows the expansion members 31 to 34 to expand. Thus, compared to when the existing gas G is forcibly ejected out of the processing tank 20 without the expansion members expanding (vacuum gas replacement), negative pressure applied to the internal space Sa can be reduced. This can reduce the resistance to pressure required for the processing tank 20.

The expansion members 31 to 34 are provided for the ceiling surface and the inner wall surfaces of the processing tank 20 other than the working surface. Thus, the first control C1 can efficiently shrink the internal space Sa. When the first control C1 is performed, the air intake and exhaust device 60 forcibly sucks the gas g into the expansion spaces Sb so that the expansion members 31 to 34 expand.

The replacement control Cr allows the existing gas G to be replaced with the dry gas D with the expansion members 31 to 34 kept expanded to shrink the internal space Sa. This allows efficient gas replacement.

The controller 80 starts the second control C2 based on the dew-point temperature of the internal space Sa. Thus, the second control C2 can be started appropriately at the right time. When the second control C2 is performed, the air intake and exhaust device 60 forcibly ejects the gas g in the expansion spaces Sb out of the processing tank 20, allowing the expansion members 31 to 34 to contract under negative pressure applied to the expansion spaces Sb. The contracted expansion members 31 to 34 can provide sufficiently large internal space Sa (working space) when the operator handles the working instrument 10. Due to the contraction of the expansion members 31 to 34, the first control C1 allows the expansion members 32 and 34 to expand to interfere with the gloves 22 when viewed from the front as shown in FIG. 3.

Second Embodiment

The second embodiment will be described below. In this embodiment, attention is paid to the differences from the first embodiment, and the description of the features similar to or same as those of the first embodiment is omitted as appropriate.

Figure 9:
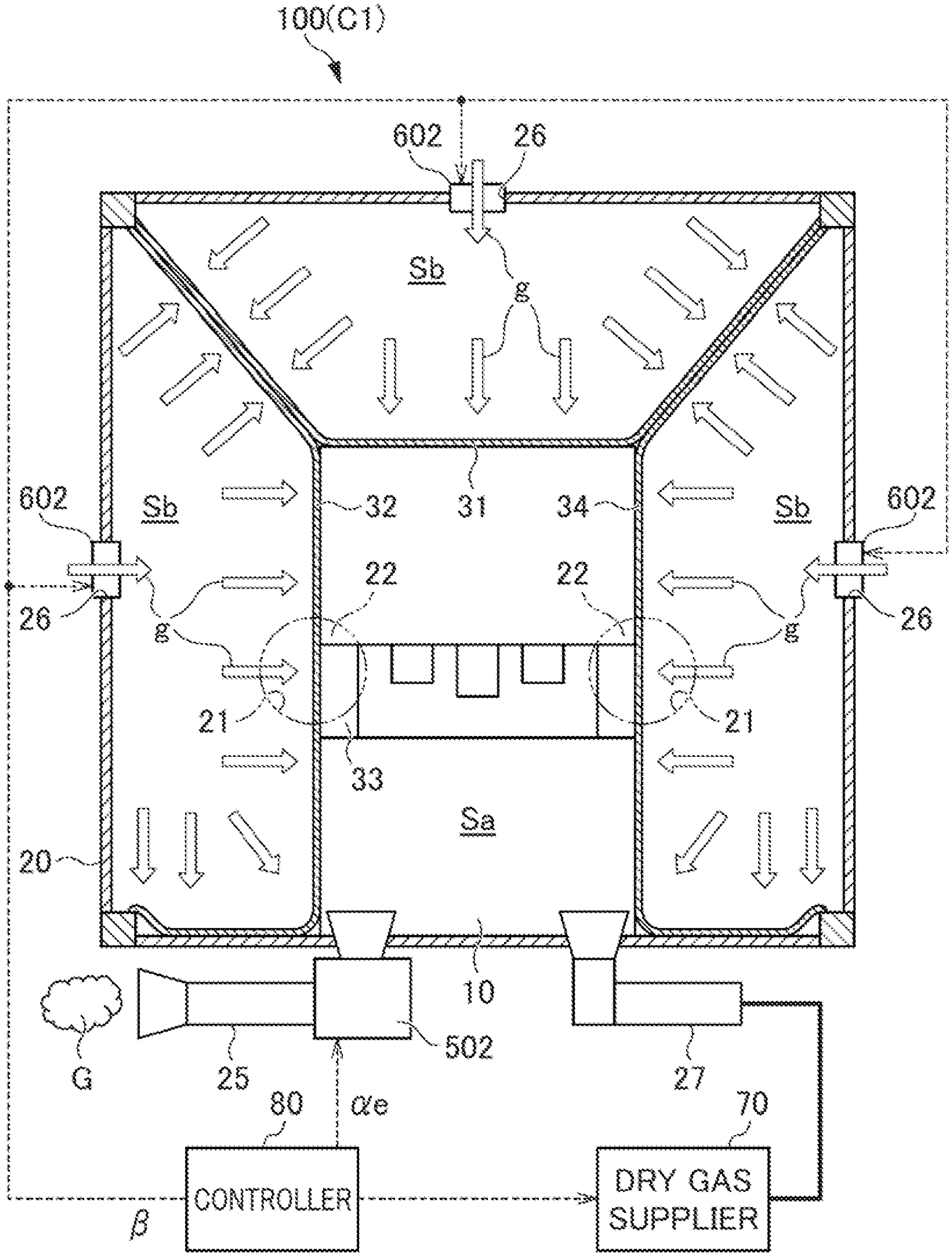
FIG. 9 is a front view illustrating a dry space creation apparatus of a second embodiment in first control.
Figure 10:
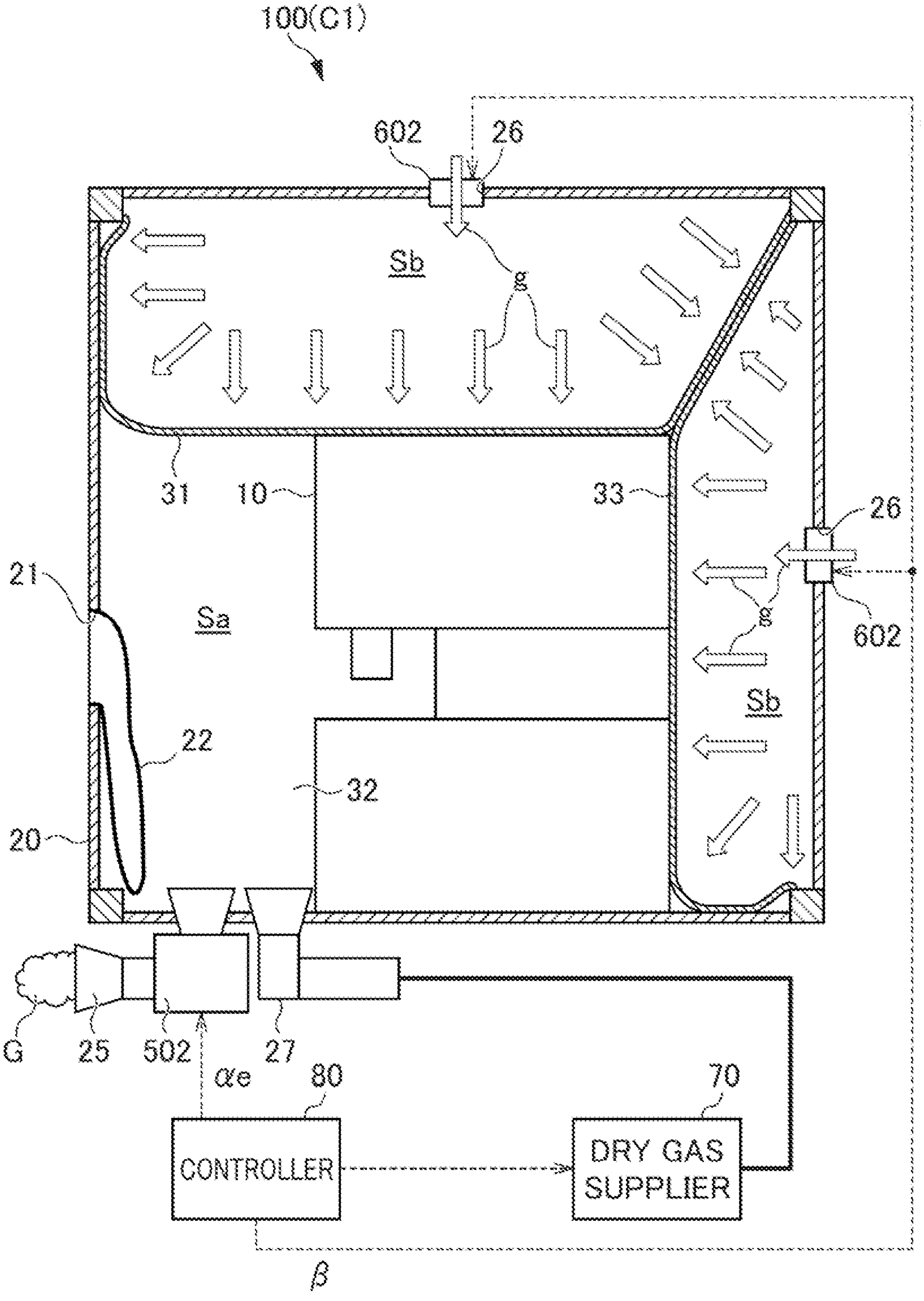
FIG. 10 is a side view illustrating the dry space creation apparatus in the first control.

FIGS. 9 and 10 are a front view and a side view illustrating a dry space creation apparatus 100 of the present embodiment in the first control C1. The dry space creation apparatus 100 includes an air intake and exhaust valve 602 in place of the air intake and exhaust device 60 of the first embodiment, and an ejector 502 in place of the discharge valve 50 of the first embodiment. The air intake and exhaust valve 602 is an electronic valve that is opened or closed by the controller 80. The air intake and exhaust valve 602 opens the connecting holes 26 when opened, and closes the connecting holes 26 when closed. The ejector 502 is a discharge device such as a blower or a pump, and discharges (forcibly ejects) the existing gas G in the internal space Sa out of the processing tank 20.

When performing the first control C1, the controller 80 transmits an ejection command ce to the ejector 502 and transmits a valve open command & to the air intake and exhaust valve 602. Receiving the ejection command de, the ejector 502 forcibly ejects the existing gas G in the internal space Sa out of the processing tank 20. Receiving the valve open command β, the air intake and exhaust valve 602 opens to open the connecting holes 26. That is, the air intake and exhaust valve 602 allows the gas g outside the processing tank 20 to flow into the expansion spaces Sb. Thus, the existing gas G in the internal space Sa is forcibly ejected out of the processing tank 20, the expansion members 31 to 34 expand under negative pressure applied to the internal space Sa, and the gas g outside the processing tank 20 flows into the expansion spaces Sb through the air intake and exhaust valve 602 by the amount of the expansion of the expansion members.

Figure 11:
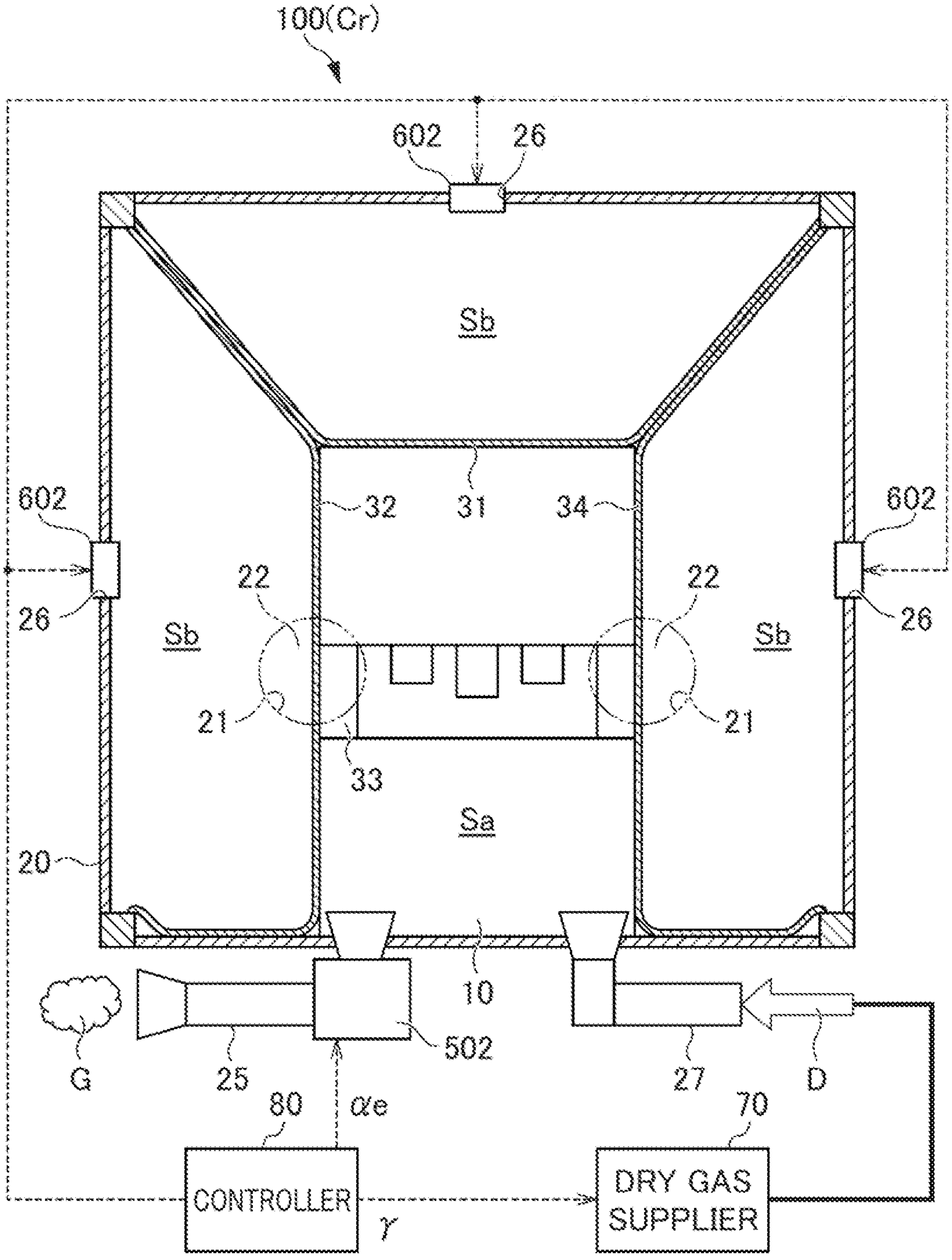

FIGS. 11 and 12 are a front view and a side view illustrating the dry space creation apparatus 100 in the replacement control Cr. When performing the replacement control Cr, the controller 80 keeps giving the ejection command de to the ejector 502, stops the valve open command β to the air intake and exhaust valve 602, and transmits a supply command γ to the dry gas supplier 70. When the valve open command β is stopped, the air intake and exhaust valve 602 closes to close the connecting holes 26. That is, the air intake and exhaust valve 602 disallows the gas in the expansion spaces Sb to flow out of the processing tank 20. Thus, with the expansion members 31 to 34 kept expanded, the ejector 502 forcibly ejects the existing gas G in the internal space Sa out of the processing tank 20, and the dry gas supplier 70 supplies the dry gas D to the internal space Sa. As a result, the existing gas G in the internal space Sa is replaced with the dry gas D.

FIGS. 13 and 14 are a front view and a side view illustrating the dry space creation apparatus 100 in the second control C2. When performing the second control C2, the controller 80 keeps giving the supply command γ to the dry gas supplier 70, stops the ejection command de to the ejector 502, and transmits the valve open command β to the air intake and exhaust valve 602. When the ejection command ce is stopped, the ejector 502 stops the forced ejection of the gas in the internal space Sa to disallow the gas in the internal space Sa to be ejected out of the processing tank 20. Receiving the valve open command β, the air intake and exhaust valve 602 opens to open the connecting holes 26. Thus, the dry gas D is kept supplied to the internal space Sa, the expansion members 31 to 34 contract under the positive pressure applied to the internal space Sa, and the gas g in the expansion spaces Sb is ejected out of the processing tank 20 from the air intake and exhaust valve 602 by the amount of contraction of the expansion members.

According to the present embodiment, the first control C1 allows the expansion members 31 to 34 to expand under the negative pressure applied to the internal space Sa by the ejector 502, and the second control C2 allows the expansion members 31 to 34 to contract under the positive pressure applied to the internal space Sa by the dry gas supplier 70, although in the absence of the air intake and exhaust device 60 of the first embodiment.

Other Embodiments

The embodiments described above may be modified as follows, for example. If the expansion spaces Sb cannot be completely sealed with inner surfaces of the processing tank 20 and the expansion members 31 to 34 only, balloons 39 may be provided in the expansion spaces Sb so that the gas g is injected in the balloons 39 as shown in FIG. 15.

In the second embodiment shown in FIG. 11 and other drawings, the air intake and exhaust valve 602 may be omitted to leave the connecting holes 26 open if the expansion members 31 to 34 are less likely to contract during the replacement control Cr although the air intake and exhaust valve 602 is removed to leave the connecting holes 26 open.

EXPLANATION OF REFERENCE NUMERALS

10 Working instrument
20 Processing tank
22 Glove
25 Outlet (ejection unit)
31 Ceiling expansion member
32 Left expansion member
33 Rear expansion member
34 Right expansion member
50 Discharge valve (ejection unit)
502 Ejector (ejection unit)
60 Air intake and exhaust device (air intake device and exhaust device)
70 Dry gas supplier
80 Controller
100 Dry space creation apparatus
C1 First control
C2 Second control
Cr Replacement control
Sa Internal space
Sb Expansion space
D Dry gas
G Existing gas
g Gas

What is claimed is:

1. A dry space creation method using a dry space creation apparatus the dry space creation apparatus comprising:

a processing tank having an internal space:

an expansion member that expands while leaving part of the internal space, the expansion member being provided in the processing tank;

an ejection unit that ejects gas in the internal space out of the processing tank;

a dry gas supplier that supplies dry gas to the internal space;

a detector that detects a dew point temperature of the internal space; and a controller that performs a first control, in which the ejection unit ejects the gas in the internal space out of the processing tank with the expansion member expanding, and a second control in which the dry gas supplier supplies the dry gas to the internal space with the expansion member contracting, the method comprising:

performing, by the controller, the first control; and subsequently starting, by the controller, the second control when a parameter that varies depending on the dew point temperature of the internal space is equal to or less than a threshold value.

2. The dry space creation method of claim 1, wherein the controller performs, after the first control and before the second control, replacement control in which the ejection unit ejects the gas in the internal space out of the processing tank with the expansion member kept expanded and the dry gas supplier kept supplying the dry gas to the internal space.

3. The dry space creation method of claim 1, wherein the dry space creation apparatus further comprises: a working instrument fixed to an inner bottom surface of the processing tank; and a glove attached to a working surface that is one of inner wall surfaces of the processing tank and allows an operator to handle the working instrument from outside of the processing tank; and wherein the expansion member is provided for at least one of the inner wall surfaces other than the working surface.

4. The dry space creation method of claim 3, wherein the expansion member is provided for each of the inner wall surfaces other than the working surface and for a ceiling surface of the processing tank.

5. The dry space creation method of claim 1, wherein the dry space creation apparatus further comprises: an air intake device as a blower or pump that forcibly sucks gas outside the processing tank into an expansion space, the expansion space being configured to allow the expansion member to expand and contract and wherein when the first control is performed, the air intake device forcibly sucks gas into the expansion space so that the expansion member expands.

6. The dry space creation method of claim 1, wherein the ejection unit includes an ejector as a blower or pump that forcibly ejects the gas in the internal space out of the processing tank and wherein when the first control is performed, the ejector forcibly ejects the gas in the internal space out of the processing tank while gas outside the processing tank is allowed to flow into an expansion space so that the expansion member expands under negative pressure applied to the internal space, the expansion space being configured to allow the expansion member to expand and contract.

7. The dry space creation method of claim 1, wherein the dry space creation apparatus further comprises: an exhaust device as a blower or pump that forcibly ejects gas in an expansion space out of the processing tank, the expansion space being configured to allow the expansion member to expand and contract; and wherein when the second control is performed, the exhaust device forcibly ejects the gas in the expansion space out of the processing tank so that the expansion member contracts.

8. The dry space creation method of claim 1, wherein when the second control is performed, the dry gas supplier supplies dry gas to the internal space while gas in an expansion space is allowed to flow out of the processing tank and the gas in the internal space is disallowed to flow out of the processing tank from the ejection unit so that the expansion member contracts under positive pressure applied to the internal space, the expansion space being configured to allow the expansion member to expand and contract.

9. A dry space creation method using a dry space creation apparatus, the dry space creation apparatus comprising:

a processing tank having an internal space;

an expansion member that expands while leaving part of the internal space, the expansion member being provided in the processing tank;

an elector as a blower or pump that forcibly ejects gas in the internal space out of the processing tank;

a dry gas supplier that supplies dry gas to the internal space; and a controller that performs a first control in which the elector ejects the gas in the internal space out of the processing tank with the expansion member expanding and a second control in which the dry gas supplier supplies the dry gas to the internal space with the expansion member contracting, the method comprising:

performing, by the controller the first control; and subsequently performing, by the controller, the second control, wherein when the first control is performed, the ejector forcibly ejects the gas in the internal space out of the processing tank while gas outside the processing tank is allowed to flow into an expansion space so that the expansion member expands under negative pressure applied to the internal space, the expansion space being configured to allow the expansion member to expand and contract.

10. The dry space creation method of claim 9, wherein the controller performs, after the first control and before the second control, replacement control in which the ejector ejects the gas in the internal space out of the processing tank with the expansion member kept expanded and the dry gas supplier kept supplying the dry gas to the internal space.

11. The dry space creation method of claim 9, wherein the dry space creation apparatus further comprises: a working instrument fixed to an inner bottom surface of the processing tank; and a glove attached to a working surface that is one of inner wall surfaces of the processing tank and allows an operator to handle the working instrument from outside of the processing tank, and wherein the expansion member is provided for at least one of the inner wall surfaces other than the working surface.

12. The dry space creation method of claim 11, wherein the expansion member is provided for each of the inner wall surfaces other than the working surface and for a ceiling surface of the processing tank.

13. The dry space creation method of claim 9, wherein the dry space creation apparatus further comprises: an exhaust device as a blower or pump that forcibly ejects gas in an expansion space out of the processing tank, the expansion space being configured to allow the expansion member to expand and contract, and wherein when the second control is performed, the exhaust device forcibly ejects the gas in the expansion space out of the processing tank so that the expansion member contracts.

14. The dry space creation method of claim 9, wherein when the second control is performed, the dry gas supplier supplies dry gas to the internal space while gas in an expansion space is allowed to flow out of the processing tank and the gas in the internal space is disallowed to flow out of the processing tank from the ejector so that the expansion member contracts under positive pressure applied to the internal space, the expansion space being configured to allow the expansion member to expand and contract.

* * * * *